(12) United States Patent
Prandoni et al.

(10) Patent No.: US 7,042,493 B2
(45) Date of Patent: May 9, 2006

(54) AUTOMATED STROBOSCOPING OF VIDEO SEQUENCES

(76) Inventors: Paolo Prandoni, Avenue de Morges 16, CH-1004 Lausanne (CH); Emmanuel Reusens, Avenue du Rond-Point 7, CH-1006 Lausanne (CH); Martin Vetterli, Chemin de Baussan 11, CH-1091 Grandvaux (CH); Luciano Sbaiz, Avenue Dapples 25, CH-1006 Lausanne (CH); Serge Ayer, Impasse Pra-Michaud 5, CH-1753 Matran (CH)

( * ) Notice: Subject to any disclaimer, the term of this patent is extended or adjusted under 35 U.S.C. 154(b) by 465 days.

(21) Appl. No.: 09/828,028

(22) Filed: Apr. 6, 2001

(65) Prior Publication Data
US 2004/0017504 A1    Jan. 29, 2004

Related U.S. Application Data

(60) Provisional application No. 60/195,233, filed on Apr. 7, 2000.

(51) Int. Cl.
H04N 7/18    (2006.01)
(52) U.S. Cl. ..................... 348/157; 348/169
(58) Field of Classification Search ............... 348/132, 348/25, 157, 169, 571, 575; 382/243; 356/23, 356/25, 26; 73/466
See application file for complete search history.

(56) References Cited

U.S. PATENT DOCUMENTS

| | | | |
|---|---|---|---|
| 4,168,510 A | | 9/1979 | Kaiser |
| 5,111,410 A | * | 5/1992 | Nakayama et al. ......... 434/258 |
| 5,764,283 A | * | 6/1998 | Pingali et al. ............... 348/169 |
| 5,923,365 A | * | 7/1999 | Tamir et al. ................. 348/169 |
| 5,953,056 A | | 9/1999 | Tucker |
| 6,122,013 A | * | 9/2000 | Tamir et al. ................. 348/587 |
| 6,201,579 B1 | * | 3/2001 | Tamir et al. ................. 348/579 |
| 6,441,846 B1 | * | 8/2002 | Carlbom et al. ............. 348/169 |
| 6,522,787 B1 | * | 2/2003 | Kumar et al. ................ 382/268 |

FOREIGN PATENT DOCUMENTS

| | | |
|---|---|---|
| DE | A1-41 35 385 | 5/1992 |
| WO | WO 99/37088 | 7/1999 |
| WO | WO 01/39130 | 5/2001 |

OTHER PUBLICATIONS

Akihito Akutsa et al. "Video interface for spatiotemporal interactions based on multi-dimensional video computing", vol. 1, Apr. 21, 1997, pp. 191-194, XP010226167, Acoustics, Speech & Signal Processing, 1997. ICASSP-97, 1997 IEEE Int'l Conference in Munich, Germany, Apr. 21-24, 1997.

J. Davis and G. Bradski, "Real-time Motion Template Gradients using Intel CVLib", Sep. 1999, pp. 1-20, XP002331182, IEEE, ICCV Workshop on Frame-Rate Vision.

* cited by examiner

Primary Examiner—Vu Le
(74) Attorney, Agent, or Firm—Blank Rome LLP

(57) ABSTRACT

Standard video footage even from a single video camera can be used to obtain, in an automated fashion, a stroboscope sequence of a sports event, for example. The sequence may be represented as a static images of a photographic nature, or by a video sequence in which camera motion remains present, in which case the video sequence can be rendered as a panning camera movement on a stroboscope picture or as an animated stroboscope sequence in which the moving object leaves a trailing trace of copies along its path. Multiple cameras can be used for an expanded field of view or for comparison of multiple sequences, for example.

35 Claims, 4 Drawing Sheets schematic block diagram of apparatus for automated stroboscoping

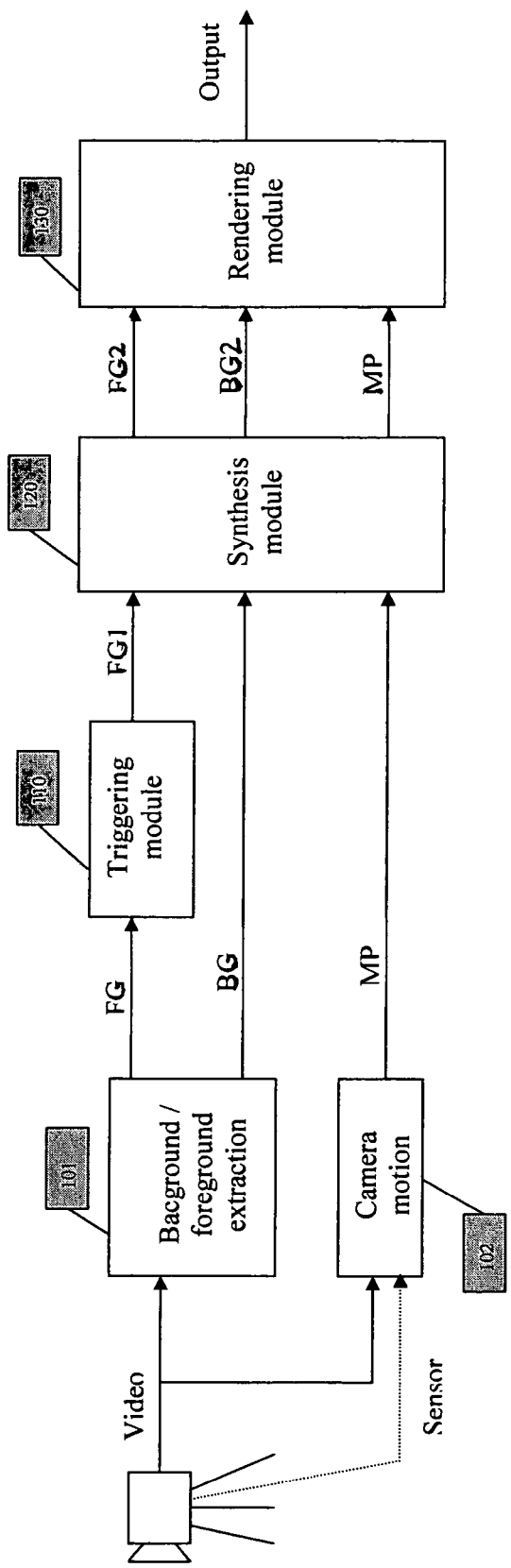
Figure 1: schematic block diagram of apparatus for automated stroboscoping

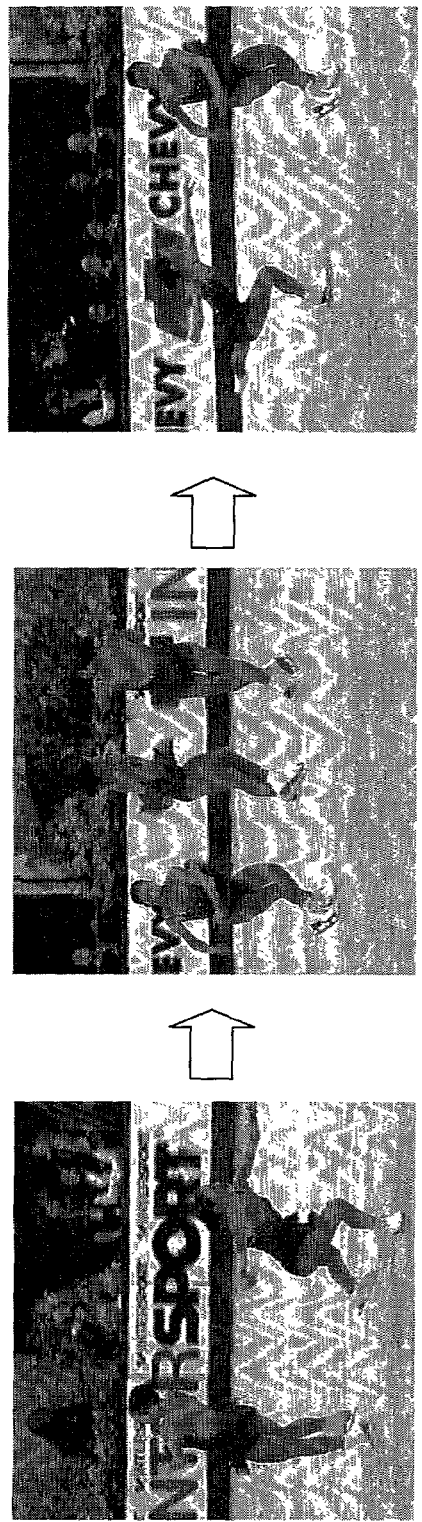

Figure 2a-c: Three frames from a stroboscoping sequence of an ice skating toe-loop triple jump. The frames are extracted from a video sequence obtained using the wide-angle synthesis method and the dynamic stroboscoping rendering method. The frames are pertaining to the beginning, the air time and the landing of the athlete. The athlete is still seen moving in the sequence, and a trail of "copies" is left behind in her path.

Figure 3: Stroboscoping image of an ice skating pair throw jump. This image is obtained from the original video footage by using the global synthesis method and the image rendering method. The end result of this kind of stroboscoping technique is a single still image of the athletes' movement, encompassing the whole duration of the jump.
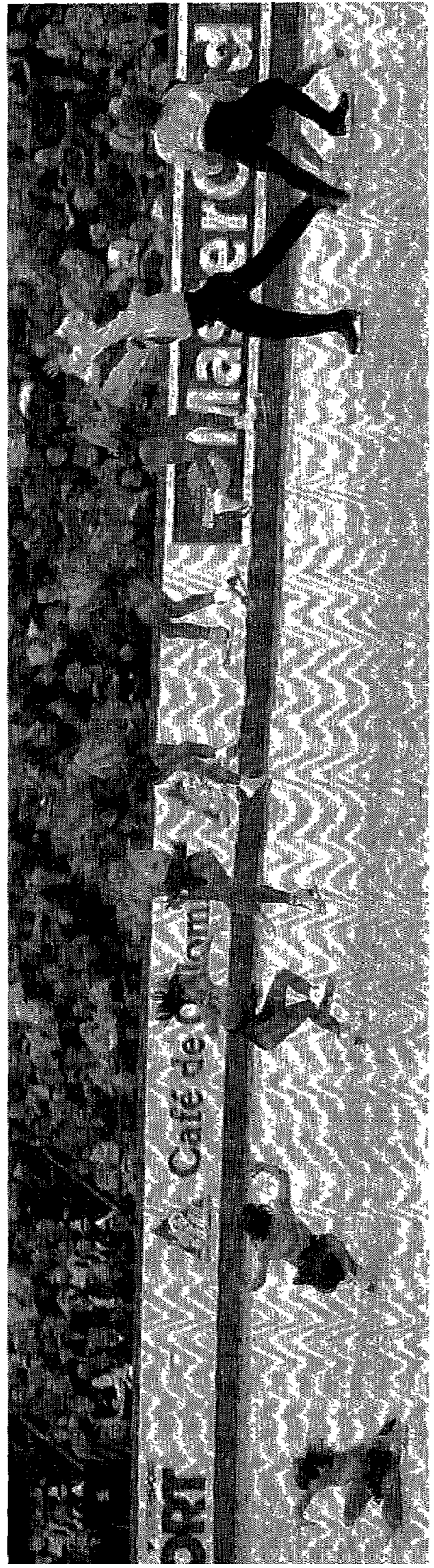

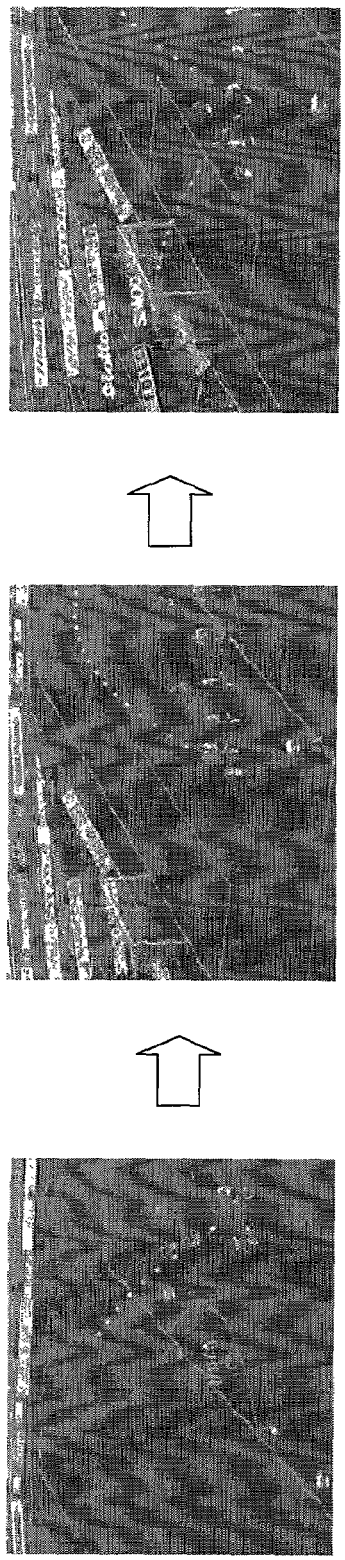
Figure 4a-c: Three frames from a stroboscoping sequence of a soccer event. The frames are extracted from a video sequence obtained using the narrow-angle synthesis method and the dynamic stroboscoping rendering method.

AUTOMATED STROBOSCOPING OF VIDEO SEQUENCES

The present invention claims priority to provisional application Ser. No. 60/195,233, filed on Apr. 7, 2000.

TECHNICAL FIELD

The present invention is concerned with techniques for generating stroboscopic images.

BACKGROUND OF THE INVENTION

A stroboscope is a device for analyzing fast motions; because of the latency properties in the human retina, a moving object seen through a rapidly switching shutter is perceived as a series of static images along the object's trajectory. In photography, a stroboscope effect can be achieved by repeatedly exposing the same film by means of a periodically switching shutter, to obtain, in the final image, repeated copies of the object along its trajectory. The same effects are achieved if, in lieu of a repeatedly switching shutter, a repeatedly switching illumination source is used. Such an illumination source is usually called a "strobolight".

In sports events, stroboscope techniques are of interest for analyzing the evolution over time and space of an athlete's gesture or stance, or other kinds of motion such as object trajectories, e.g. of balls, racquets, clubs and the like. Static photographic techniques are already in use, providing a "visual synopsis" of a fast sport action such as the 100 meter dash, for instance. Since, typically, the field of view of a static photographic camera cannot encompass the entire spatial extent of the athlete's course, relatively cumbersome solutions have been employed, in which several cameras are placed along the path of the athlete and synchronized so as to take a shot of the path when the athlete passes by. The resulting successive images can be joined together to compose a global view of the event in space and time.

SUMMARY OF THE INVENTION

We have recognized that standard video footage even from a single video camera can be used to obtain, in an automated fashion, a generalized stroboscope sequence of a sports event, for example. The notion of a generalized stroboscope sequence includes a static image of photographic nature, e.g. of the type generated by known stroboscoping techniques as described above. Also, a generalized stroboscope sequence can be a video sequence in which camera motion remains present, in which case the video sequence can be rendered as a panning camera movement on a stroboscope picture or as an animated stroboscope sequence in which the moving object leaves a trailing trace of copies along its path. Multiple cameras can be used for an expanded field of view or for comparison of multiple sequences, for example.

BRIEF DESCRIPTION OF THE DRAWING

FIG. 1 is a schematic block diagram of apparatus for automated stroboscoping.

FIGS. 2a–2c are frames from a stroboscoping sequence of an ice skating toe-loop triple jump.

FIG. 3 is a stroboscoping image of an ice skating pair throw jump.

FIGS. 4a–4c are frames from a stroboscoping sequence of a soccer event.

DETAILED DESCRIPTION

FIG. 1 shows exemplary apparatus for producing a stroboscope sequence from a single-source video sequence in accordance with a preferred embodiment of the invention.

The video sequence from a standard camera is fed to a Background-Foreground Extraction Module 101 for separating the video information into a sequence/stream BG of background images and a sequence/stream FG of foreground images, with one background image and one foreground image for each frame of the original video sequence.

The same video sequence is fed also to a Camera Motion Estimation Module 102 for extracting a stream MP of camera motion parameters. If the camera is equipped with motion tracking sensors, the Module 102 can receive an additional input from the camera.

The foreground video information stream FG is fed to a Triggering Module 110, for selecting from the stream FG multiple instances FG1 of representations of one or several foreground features to appear in the stroboscoping sequence, e.g. objects, individuals, body parts or outlines. For example, in a soccer game the ball and one or several players may be chosen for stroboscoping. For the ball, stroboscoping may be of interest for each frame, while copies of players may be placed only at key instants in the action. Thus, at different triggering instants the selection of features can differ as to their number and quality.

The foreground images FG1 together with the stream of background images BG and the motion parameters MP are further processed by a Synthesis Module 120 which, according to a prescribed stroboscoping strategy, processes the visual information in the streams FG1 and BG to produce streams FG2 and BG2 in which a composite parametric description of the stroboscope sequence is embedded.

Finally, following a prescribed rendering strategy, a Rendering Module 130 transforms the embedded representation and the visual information of the streams FG2 and BG2 into an output sequence suitable for display on a video device or photographic print medium.

The Foreground Extraction Module 101, Camera Estimation Module 102, Triggering Module 110, Synthesis Module 120 and Rendering Module 130 are described below in further detail.

A. Background-Foreground Extraction and Motion Parameter Modules

First in producing a stroboscope sequence, in foreground-background estimation, objects moving in the foreground are segmented from the background, and, unless known from camera instruments, the camera motion parameters are estimated. Foreground-background estimation identifies the moving object(s) in the video frames, e.g. the foreground athlete(s) and equipment (e.g. a soccer ball) versus the background sport field. The motion parameters provide for a common visual referential for the video sequence, so as to enable blending together successive frames of the video sequence. Foreground-background and camera motion estimation can be carried out using established video processing techniques, in partially or fully automated fashion.

B. Triggering Module

The Triggering Module 110 serves for selecting those foreground features which will be inserted in the stroboscope sequence. Such selection can proceed according to one of the following strategies:

1. Frame-based triggering, in which foreground features are selected at fixed frame intervals, say every n frames.

2. Time-based triggering, in which foreground features are selected at fixed time intervals, say every t seconds.

3. Spatial triggering, in which foreground features are selected when in alignment with pre-specified locations in the background.

4. Event-based triggering, in which foreground features are selected when a specific action takes place (e.g. each time an athlete touches down in a triple jump).

5. User-defined triggering strategy, in which foreground features are selected ad-hoc as desired, e.g. involving a user clicking on features in frames.

C. Synthesis Module

The Synthesis Module 120 serves for the registering, pre-processing and re-framing of the selected foreground features and the background visual information. As the stroboscope process results in a composite picture or video sequence in which visual information from different instants in time is compounded, pre-processing serves to establish a common visual referential for the composite images. Such pre-processing includes the computation of a common focal plane, the construction of a composite background image, and the warping of the foreground features onto the chosen focal plane. These computations are performed according to a given synthesis strategy, such as:

1. Wide angle synthesis, in which the field of view is expanded to encompass a pre-defined portion of the foreground motion; e.g, in triple jump the field of view can be expanded to ensure that the whole excursion of the final jump fits on the field of view;

2. Narrow angle synthesis, in which a wide-angle shot of an event (e.g. a horse race such as steeple chase) is narrowed to encompass a user-defined portion of the background where the action is taking place;

3. Global synthesis, in which the field of view is determined so as to encompass the entire course of the foreground movement; e.g., in triple jump the field of view can be expanded to ensure that the leading run and all the jumps fit within the field of view.

D. Rendering Module

Once the synthesis parameters have been computed, the stroboscope sequence is created as a visual image by the Rendering Module 130 which can employ one of the following rendering strategies to produce either a video sequence or a static image:

1. Still picture stroboscoping, used to generate a single image from the video sequence, in which the field of view is in accordance with the synthesis strategy of module 120, and in which the selected foreground features are inserted in the common reconstructed background;

2. Scanned stroboscoping, used to generate a video sequence from a still picture stroboscoping image obtained as per 1. above, in which the still picture is scanned horizontally or vertically or both for displaying on a video screen. Such scanning need not be uniform but may be with varying scanning direction, speed and focal length, for example. Scanning parameters may be chosen interactively, e.g involving a user manipulating a joy stick;

3. Dynamic stroboscoping, used to generate a video sequence re-framed according to the synthesis strategy of module 120, in which the foreground objects are permanently inserted in the background when the triggering instants are reached and in which, in between triggering instants, the foreground motion proceeds normally;

4. De-multiplication, used to generate a video sequence re-framed according to the synthesis strategy of module 120, in which copies of the foreground object are permanently inserted in the background when the triggering instants are reached and in which the foreground object leaves a semi-transparent "trace" of its movement in between triggering instants.

5. Motion unrolling, used to generate a video sequence re-framed according to the synthesis strategy of module 120, in which copies of the foreground object are inserted in a possibly synthetic background with an arbitrary spatial displacement. This is useful to apply stroboscoping to fast rotation movements which unfold "in place", e.g. the fast spin of an ice skater around her axis.

Rendering a stroboscope further can include controlling foreground object persistency, e.g. so that earlier representations of the object are made to appear to fade and become transparent progressively as compared with later representations. Similarly, foreground objects can be suitably colored as a function of a time index. Thus, in a still picture of a football game, for example, it will be apparent at what time a player is where he is shown. Coloring can also be used for purposes other than time indexing, e.g. in a football game for player identification, with different players shown in different colors.

When sufficient information is available, e.g. as obtained from multiple representations of an action from different points of view, stroboscopic rendering can include spatially 3-dimensional reconstruction to enable viewing from points selected other than a camera location, e.g. in a virtual tour or fly-around fashion. Traces of features can be left over time, e.g to show position, trajectory and stance of an ice skater. In a soccer event, the ball can be made to appear in a stroboscopic fashion in three dimensions.

E. EXAMPLES

A stroboscoping video sequence was generated of an ice skating toe-loop triple jump, using wide-angle synthesis and dynamic stroboscoping rendering. Selected frames, shown as FIGS. 2a–2c pertain to the beginning, the air time, and the landing of the athlete. As the athlete is seen moving in the sequence, a trail of copies is left behind in her path.

A stroboscoping image was generated from original video footage of an ice skating throw jump, using global synthesis and image rendering. The result, shown as FIG. 3 is a single still image of the athletes' movement, encompassing the entire duration and spatial extent of the jump.

From an original video sequence of a soccer event, a stroboscoping sequence was generated using narrow-angle synthesis and dynamic stroboscoping image rendering. The specific frames shown as FIGS. 4a–4c show phases of a successful scoring event, with the ball being represented repeatedly, at positions it has traversed.

F. APPLICATIONS AND EXTENSIONS

A first application of the technique is the detailed analysis of sports in which a single athlete performs a fast gesture with a significant extension in space. Sports such as jumps (long jump, triple jump, high jump) or diving or ice skating can benefit from this type of analysis.

Stroboscoping is also of interest for tracing trajectories of objects like soccer balls, tennis balls and so on. In this case, as exemplified by FIGS. 4a–4c described above, the sequences are obtained by inserting in the current video frame several copies of the video image of the ball at the location the ball occupied at previous instants in time Such copies are obtained from previous video fields which are warped onto the visual referential of the current video field. The advantage over known trajectory tracing methods is that the speed of the ball is implicitly shown in the stroboscoped trajectory, as the spacing between the images of the ball shows the speed of the ball.

The system can be extended to on-demand video delivery services. Thus, stroboscoping can be used to perform an exact comparison of two athletic performances by combining it with overlay capabilities as described in PCT International Applications PCT/IB99/00173 of 15 Jan. 1999 and PCT/US/0032117 of 24 Nov. 2000.

Stroboscope sequences can be used also to visually index sports events. For Internet-based content delivery, for instance, they can provide a quick and intuitive interface to select and recall a specific portion of an athletic gesture, as a starting point for more detailed analysis and graphical enhancements.

The invention claimed is:

1. A Computer method for generating a stroboscopic representation from images in at least one original video sequence, comprising:
   (a) extracting a foreground portion from the images to provide a foreground sequence;
   (b) selecting at least one feature to be included in the stroboscopic sequence from the foreground sequence to provide a foreground selected sequence;
   (c) choosing a common focal plane;
   (d) synthesizing the foreground selected sequence on a background sequence, using warping of foreground features onto the chosen common focal plane, to provide a synthesized sequence; and
   (e) rendering a stroboscopic representation from the synthesized sequence as a video including multiple representations of at least one foreground feature frozen at triggering instants.

2. The method according to claim 1, wherein the images are from a fixed field of view.

3. The method according to claim 1, wherein step (a) comprises estimating camera motion in making the original video sequence.

4. The method according to claim 3, wherein the camera motion is estimated with sensors equipping the camera.

5. The method according to claim 3, wherein estimating camera motion is carried out using video processing techniques.

6. The method according to claim 1, wherein step (b) comprises selecting at a fixed frame interval.

7. The method according to claim 1, wherein step (b) comprises selecting at clocked time intervals.

8. The method according to claim 1, wherein step (b) comprises selecting at specified foreground events.

9. The method according to claim 1, wherein step (b) comprises accepting input for the feature to be selected.

10. The method according to claim 1, wherein step (c) comprises choosing a field of view for the stroboscopic representation.

11. The method according to claim 10, wherein the field of view is the same as an original field of view.

12. The method according to claim 10, wherein the field of view is greater than an original field of view.

13. The method according to claim 10, wherein the field of view encompasses all of a foreground movement.

14. The method according to claim 10, wherein the field of view is less than an original field of view.

15. The method according to claim 1, wherein step (e) comprises rendering the stroboscopic representation as a still image and converting the still image to video.

16. The method according to claim 15, wherein converting comprises scanning.

17. The method according to claim 16, wherein scanning comprises accepting input for at least one scanning parameter.

18. The method according to claim 17, wherein the scanning parameter is one of scanning direction, scanning speed and focal length.

19. The method according to claim 17, wherein the input is from a joy stick device.

20. The method according to claim 1, wherein step (e) comprises rending multiple representations of at least one foreground feature, with the representations being spaced apart.

21. The method according to claim 20, wherein the spacing of the representations is according to a function of time.

22. The method according to claim 20, wherein the spacing of the representations corresponds to their actual spatial travel.

23. The method according to claim 20, wherein the spacing of the representations is for spatially contiguously unrolling an action of an object turning on an axis.

24. The method according to claim 1, wherein the background sequence represents a synthetic background.

25. The method according to claim 1, wherein step (e) comprises controlling foreground feature persistency.

26. The method according to claim 25, wherein controlling is for older representations of a foreground feature as a function of time to appear increasingly transparent.

27. The method according to claim 1, wherein step (e) comprises assigning a distinctive brightness/color to at least one foreground feature.

28. The method according to claim 27, wherein the brightness/color is selected as a function of time.

29. The method according to claim 1, wherein step (e) comprises 3-dimensional reconstruction of the stroboscopic representation.

30. The method according to claim 1, wherein the at least one original video sequence is of a sports event.

31. The method according to claim 1, further comprising broadcasting the stroboscopic representation.

32. The method according to claim 1, further comprising delivering the stroboscopic representation over the Internet.

33. A system for generating a stroboscopic representation from images in at least one original video sequence, the system comprising:
   (a) means for extracting a foreground portion from the images, resulting in a foreground sequence;
   (b) means for selecting from the foreground sequence at least one feature to be included in the stroboscopic sequence, resulting in a foreground selected sequence;
   (c) means for choosing of a common focal plane;
   (d) means for synthesizing the foreground selected sequence on a background sequence, by warping said at least one feature onto said chosen common focal plane, resulting in a synthesized sequence; and
   (e) means for rendering the stroboscopic representation from the synthesized sequence as a video including multiple representations of at least one foreground feature frozen at triggering instants.

34. A system for generating a stroboscopic representation from images in at least one original video sequence, the system comprising:
  (a) an extraction module extracting a foreground portion from the images, resulting in a foreground sequence;
  (b) a triggering module for selecting from the foreground sequence at least one feature to be included in the stroboscopic sequence, resulting in a foreground selected sequence;
  (c) a synthesis module for choosing a common focal plane and synthesizing the foreground selected sequence on a background sequence by warping said at least one feature onto said chosen common focal plane, resulting in a synthesized sequence; and
  (e) a rendering module for rendering the stroboscopic representation from the synthesized sequence as a video including multiple representations of at least one foreground feature frozen at triggering instants.

35. A system for rendering a stroboscopic representation from images in a video sequence, comprising a processor which is instructed for:
  (a) extracting a foreground portion from the images to provide a foreground sequence;
  (b) selecting at least one feature to be included in the stroboscopic sequence from the foreground sequence to provide a foreground selected sequence;
  (c) choosing a common focal plane;
  (d) synthesizing the foreground selected sequence on a background sequence, using warping of foreground features onto the chosen common focal plane, to provide a synthesized sequence; and
  (e) rendering a stroboscopic representation from the synthesized sequence as a video including multiple representations of at least one foreground feature frozen at triggering instants.

* * * * *